ately terminating the test when change in trend occurs.

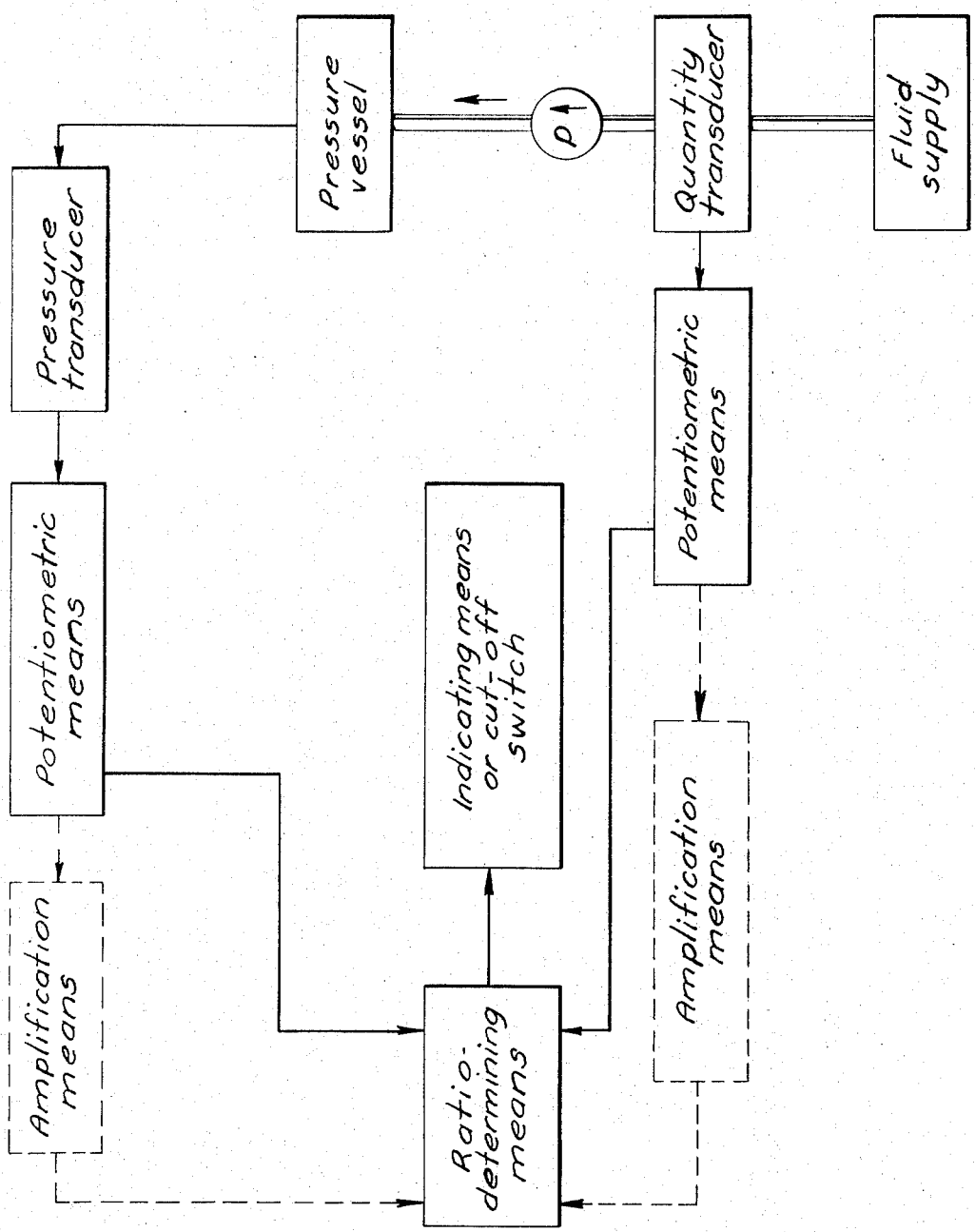

United States Patent Office 3,365,933
Patented Jan. 30, 1968

3,365,933
HYDROSTATIC TESTING OF STRUCTURES
Roy C. Jorgensen, Lake Jackson, Tex., and Thomas O. Wood, Titusville, Fla., assignors to The Dow Chemical Company, Midland, Mich., a corporation of Delaware
Continuation-in-part of application Ser. No. 382,899, July 15, 1964. This application May 4, 1967, Ser. No. 636,191
2 Claims. (Cl. 73—37)

ABSTRACT OF THE DISCLOSURE

An improvement in the method for the hydrostatic testing of pressure vessels which comprises: driving voltages corresponding to the internal pressure and volume of liquid introduced into the vessel; bucking the voltages which increase proportionally while the vessel is below its elastic limit through a potentiometric means to produce a signal which is constant while the indicated voltages remain proportional; monitoring the resultant signal as fluid is pumped into the vessel; and denoting when the voltages no longer are proportional thereby detecting the elastic limit of the vessel.

---

This application is a continuation-in-part of U.S. patent application Ser. No. 382,899, now abandoned entitled "Improvement in Hydrostatic Testing of Structures" filed July 15, 1964.

This invention relates to a method of indicating trend changes and, more particularly concerns an improvement in detecting the elastic limit of pressure vessels undergoing the method of non-destructive hydrostatic testing of pressure vessels.

The term "pressure vessel" as used herein, means closed or sealable containers of any shape which ordinarily are subjected to pressure in use and is meant to include gas storage cylinders, reactor tanks, pressure tubing and pipes, pipe lines, tank cars, storage tanks, boilers, boiler tubes, missile parts, combinations of the same and the like.

The term "transducer" as used herein means a device activated by power from one system and supplying power to a second system.

In the hydrostatic testing of pressure vessels, a substantially incompressible fluid is pumped, under pressure, into a fluid-filled test vessel. As an increasing quantity of fluid is pumped into the vessel, the internal pressure of said vessel rises. The quantity of fluid pumped into said vessel is proportional to the internal pressure in the vessel until the elastic limit of the vessel has been reached. Beyond the elastic limit, quantity of fluid pumped and internal pressure are no longer proportional to one another. This readily can be seen, for example, from a recording of the internal pressure versus quantity of fluid introduced into a fluid-filled vessel under test wherein a straight line is produced prior to the vessel reaching its elastic limit. Beyond the elastic limit, the line deviates in slope.

Presently, the method of detecting changes in trends used in making tests of the above described type included visual inspection of slope of the curves drawn by one or two chart pens to ascertain if the slope is changing or by means of photoelectric trend indicators. The first method is not accurate enough for observing small changes in trend due to the human error involved. The second method is complex, expensive and gives no indication of slope change until the equipment is shut down. The improvement of this invention supplies an accurate method for detecting trends or small changes in trends during the non-destructive hydrostatic testing of pressure vessels while giving a continuous indication of trend changes on an electrical meter or graphic record. It also provides for automatically terminating the test when change in trend occurs.

It is a principal object of the present invention to provide an improved method for detecting a change in the trend of the relationships of variables to one another in the hydrostatic testing of pressure vessels.

It is an additional object to provide a method for detecting small changes in trends during the non-destructive hydrostatic testing of pressure vessels while giving a continuous visual or audible indication of trend change on an electric meter, by the ringing of a bell, the flashing of a light, the reading of a meter and the like.

It is a further object of the present invention to provide a method for automatically controlling and terminating pressure vessel tests conducted using a non-destructive hydrostatic method of testing.

These and other uses, objects and advantages of the instant invention will be apparent from reading the detailed description presented hereinafter in conjunction with the accompanying drawings in which:

The figure shows schematically one embodiment of a pressure vessel testing apparatus used in the method of the present invention.

The instant invention is an improvement in the method for the non-destructive hydrostatic testing of pressure vessels by pumping fluid into the interior of a fluid-filled pressure vessel thereby applying continually increasing pressure therein, detecting the pressure increase within said pressure vessel, detecting the quantity of fluid pumped into said pressure vessel, monitoring said internal pressure and said quantity of fluid pumped into said pressure vessel to determine the point at which the pressure increase is not proportional to the increased quantity of fluid pumped into said vessel thereby detecting the elastic limit of said vessel and discontinuing the test at about said elastic limit. The instant improvement in said method comprises deriving voltages corresponding to internal pressure in said test vessel and to the quantity of fluid pumped therein. The voltages, which are usually created by transducers, corresponding to the internal pressure of said pressure vessel and the quantity of fluid pumped therein are proportional to each other in a definite and constant ratio, i.e. they are in balance, while the vessel is pressurized to a point below its elastic limit. The voltages are monitored as the fluid is being continually pumped into the vessel. The point at which the voltages are no longer proportional, i.e. in balance, is denoted thereby detecting the elastic limit of the vessel.

One embodiment of an apparatus which can be employed in carrying out the present invention is shown schematically in the figure. A pressure transducer is attached to the pressure vessel and a quantity transducer is connected to the fluid supply. In this embodiment two potentiometric means, capable of adjusting the voltage from each transducer to create output voltages which are in a definite ratio to each other, i.e. a ratio of one to one is usually employed, are then connected to said pressure transducer and to said quantity transducer as shown. Although commonly referred to as potentiometric means in the present embodiment, they essentially perform the function of variable resistors. A ratio determination means is connected with both the potentiometric means. The pressure vessel undergoing testing is filled with a fluid, e.g. water. As increasing quantities of fluid are pumped from the fluid supply into the fluid-filled pressure vessel the internal pressure in said vessel rises. The pressure transducer translates internal pressure in the pressure vessel to a corresponding electrical voltage. The quantity transducer translates quantity of fluid pumped into said fluid-filled test vessel to a corresponding electrical voltage. The two voltages, being a function of internal pressure and fluid pumped respectively, are in a definite proportion to one another so long as the vessel undergoing test has not been stressed beyond its elastic limit. Prior to pressurizing to the point at which the elastic limit has been reached by adjusting to provide output signal voltages which are in a definite proportion to one another, the two voltages from the transducers are balanced by the two potentiometric means. The balanced signal voltages are then transmitted to a ratio determining means such as, for example, a potentiometric means capable of bucking the two signal voltages. The ratio determining means is then connected to an indicating or cut-off means, such as, for example, a meter, a buzzer, a bell and the like.

When the two potentiometric means are used, the voltages from the transducers are usually reduced and balanced, i.e. output signals in a definite ratio are created. The voltages are thereby controlled so as not to detrimentally affect said ratio determining and indicating means, or any amplification means that might be used. As long as the elastic limit of said vessel has not been reached, the signal voltages from the potentiometric means will remain in balance, i.e. in a constant ratio, and the indicating device will not respond. However, once the elastic limit of the vessel has been exceeded, the two voltages from the transducers corresponding to pressure and quantity will not be proportional to one another; the signal voltages leaving the potentiometric means will no longer be in balance and the ratio determining means senses this change thereby setting off said indicating or cut-off device. The disproportionality of the voltages from the transducers is denoted by the indicating means and indicates that the elastic limit of the test vessel has been exceeded. The pump can then be shut down thereby terminating the test.

The instant method can be refined and thereby more accurately denote when the elastic limit of the vessel has been reached by providing amplification means for said balanced signal voltages. Thus, for example, resistor elements and/or a vacuum tube or suitable transistor elements can be connected to said potentiometric means. The ratio determining means can then be connected to each of said amplification means as shown by the dotted lines in the figure. When the signal voltages from the potentiometric means become imbalanced, i.e. when the test vessel has been stressed beyond its elastic limit, this voltage imbalance is magnified by said amplification means so that it is more readily discernable by said ratio determination and indicating means. The amplification means hooked up to said potentiometric means and said indicating means can itself be balanced by potentiometric means in a manner similar to that indicated hereinbefore and the resulting balanced voltage signals directed to a ratio determination means.

The potentiometric means can be adjusted to balance each of said voltages from the transducers to zero or any desired constant ratio in signal voltages can be employed. When the signal voltages from the transducers are adjusted to zero, a change in the proportionality of the voltages from the transducers will cause a voltage signal to flow to the ratio determining means and thus set off the indicating means.

The hydrostatic pressure test can be terminated automatically upon reaching the elastic limit of the vessel undergoing test. For example, the test can be terminated electrically by using electrical relays which are in direct communication with the indicating device and the pump. The relays are automatically activated by an electrical signal transmitted to said indicating means when an imbalance, i.e. change in the preset ratio, occurs in the signal voltage from the two potentiometric means, thereby automatically shutting down the pump, discontinuing the introduction of fluid into the vessel and terminating the test.

The embodiment presented hereinbefore presents a preferred arrangement of the various components so as to accurately denote the point at which the elastic limit of the vessel has been reached. Various other arrangements may be employed without departing from the novel improved method described herein. For example, the voltages from the quantity transducer and the pressure transducer may be bucked through one potentiometric means. As indicated, as long as the internal rise in presure is directly proportional to the increase in volume of liquid introduced therein, the voltages from the transducers will change proportionally. When the voltages are bucked through one potentiometric means, a disproportionality in the two incoming voltages will be sensed by the potentiometric means and a signal is sent from the potentiometric means to an indicating or cut-off means thus denoting that the elastic limit of the vessel has been reached.

Other methods for automatically terminating the pressure test include the use of mechanical means such as pressure-volume controls, valve mechanisms and the like.

Pressure transducers suitable for use herein include any transducer that will give a voltage output proportional to the pressure applied.

Quantity transducers useful herein include any transducer that will give a voltage output proportional to the amount of fluid delivered to the test vessel.

Amplification means useful herein include, but are not limited to, vacuum tube-voltmeter circuits and suitable transistors.

Indicating means suitable for use herein include, for example, a meter equipped with adjustable contacts which can be used to energize a relay or a series of relays connected to the pump.

The pump and incompressible fluids suitable for use herein are those which are normally used in the non-destructive, hydrostatic testing of pressure vessels.

Various modifications can be made in the instant invention without departing from the spirit or scope thereof, for it is to be understood that we limit ourselves only as defined in the appended claims.

What is claimed is:

1. In a method for the non-destructive hydrostatic testing of pressure vessels by pumping fluid into the interior of a fluid-filled pressure vessel thereby applying continually increasing pressure therein, detecting the pressure increase within said pressure vessel, detecting the quantity of fluid pumped into said pressure vessel, monitoring said internal pressure and said quantity of fluid pumped to determine the point at which pressure is not proportional to the quantity of fluid pumped into said vessel thereby detecting the elastic limit of said vessel, the improvement which comprises:

(a) deriving voltages corresponding to internal pressure in said test vessel and to quantity of fluid pumped there;

(b) balancing the voltages corresponding to the internal pressure of said pressure vessel and the quantity of fluid pumped therein while said vessel is below its elastic limit to produce a resultant signal;
(c) monitoring said signal as said fluid is pumped into said vessel; and
(d) denoting when said voltages are no longer in balance thereby detecting the elastic limit of said vessel.

2. The method in accordance with claim 1 including the step of automatically discontinuing the test at about said elastic limit.

References Cited

UNITED STATES PATENTS 3,157,185  10/1962  Horne et al. _____ 73—37

FOREIGN PATENTS 247,419  9/1961  Australia.

LOUIS R. PRINCE, *Primary Examiner.*

WILLIAM HENRY, II, *Assistant Examiner.*